(No Model.)
T. B. CAMPBELL.
PUG MILL.
No. 509,360.  Patented Nov. 28, 1893.
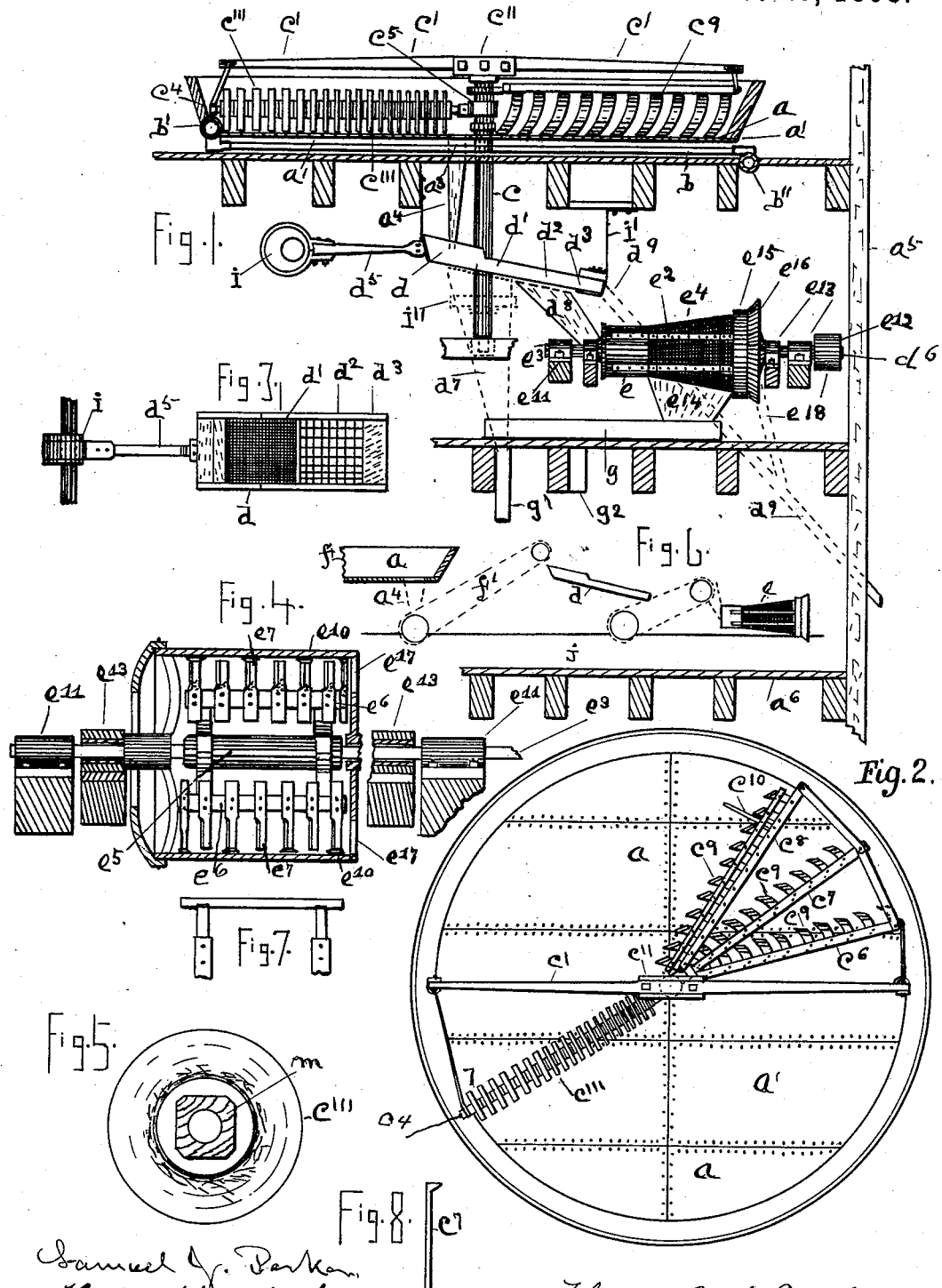
Witnesses:
Samuel J. Perkan.
Helen W. Mack.
Inventor:
Thomas Blake Campbell.

UNITED STATES PATENT OFFICE.

THOMAS BLAKE CAMPBELL, OF ITHACA, NEW YORK.

PUG-MILL.

SPECIFICATION forming part of Letters Patent No. 509,360, dated November 28, 1893.

Application filed April 22, 1892. Serial No. 430,280. (No model.)

*To all whom it may concern:*

Be it known that I, THOMAS BLAKE CAMPBELL, a citizen of the United States of America, and a resident of Ithaca, Tompkins county, New York, have invented an Improved Pug-Mill, with Sieves and Appliances for Separating Refuse from the Pulverized Clay Attached Thereunto, of which the following is a specification, reference being had to the accompanying drawings.

My invention consists of a pug-mill and its attachments. No part of the mechanism I use can be omitted without an imperfect result. I dig from the clay bed, the clay, and deposit it in bulk on a large floor situated on the ground, which is heated by steam pipes beneath it; whence by any suitable elevator the partially dried clay is raised to the third floor of a suitable building in a continuous stream like supply, where it falls on a metallic bed, or pan, made preferably of large steel boiler plates, in which it is pulverized by a long series of rather small disk cutters, which revolve rapidly about the pan floor, while the clay is being further dried by steam pipes beneath the pan; this bed, or pan, being twenty or thirty more feet in diameter, according to the desired capacity, of the brick or other works. From this large pan the clay cut, and pulverized by the disks falls on a screen, which rapidly oscillates; by which the fine clay is separated; and the coarse stones and the refuse delivered into a spout which conveys them out of the building. This screen is placed preferably near the top of the second floor of my building, directly beneath the heating and pulverizing pan. But a quantity of clay, quite small lumps, and fine stones yet remain; which falling through the second part of the just named screen, are by a spout conveyed to the third part of my machine; which is a strong iron cylinder, in which rapidly revolving beaters, pulverize these small lumps of clay; when they, now fine dust, fall with the fine stones, on a round screen attached to and revolving with the iron cylinder; whereby the fine clay is separated and joins the clay of the upper flat screen; and the stones are by a spout conveyed out of the building. The clay thus prepared, I temper in a screw conveyer on the floor of the second story of my building; whence in a stream like supply it falls down to and enters the brick molding machine, on the ground floor of my building and is made into bricks; or the clay is stored to be used for other purposes.

The nature of my machinery will be apparent as I describe my invention.

Figure 1 is a sectional elevation of the two upper stories of my building with my machinery in it; Fig. 2, a view looking down on my pulverizing bed or pan; Fig. 3, a view from above of my separating screen; Fig. 4, a sectional elevation of my iron cylinder and its beaters; Fig. 5, of the wood boxing of the cutters; Fig. 6, a view of my machine adapted to a one story building; and Figs. 6 and 7 detached views of my beaters, and Fig. 8 is a detail view.

In the figures $a$ is my circular bed or pan; on any convenient place of the outer edge of which falls the stream like continuous supply of clay, as elevated from the ground floor; on which bed the clay is cut and pulverized by the series of cutters $c'''$, revolving on the horizontal shaft $c^4$; which shaft and disk-cutters occupy one half of the diameter of the circular bed pan; the cutters being quite small in size and numerous and wide faced on the outer end of the said shaft; and quite sharp on the inner end of the said shaft. A perpendicular shaft $c$ has on its top the propelling cross bar or beam $c'$; and just below this beam, the inner end of the shaft $c^4$ is loosely banded to the shaft $c$; and at one of the outer ends of the beam, the outer end of the shaft $c^4$ is attached to the beam by a connecting rod; so that the beam being at $c''$ fast to the top of the shaft $c$, the power communicated to the shaft $c$ moves the cutter about and over the pan floor, and the clay on it. By a similar arrangement three arms, $c^6$, $c^7$, $c^8$ are loosely banded to the shaft $c$, and connected by rods to the other end of the cross bar beam. These arms move each a series of scrapers attached to them, as indicated in Fig. 2, in which the direction of revolution is indicated, by an arrow. The scrapers are inclined toward the center of the bed $a$, and deliver the clay through the aperture $a^3$ to the screen $d$. The screen $d$ is suspended by flat elastic rods to the joists of the floor above it; and is composed of three surface portions, as indicated in Fig. 3. The upper one $d'$ receives the clay from the bed pan $a$; and through it goes the fine clay. Thence the small lumps of unpulverized clay go to the second surface $d^2$, through which they fall; while the stones and refuse roll over the third surface $d^3$. Spouts beneath these surfaces of the screen receive and dispose of the thus separated material. One $d^7$ for the fine clay conveys that to the screw tempering, and conveying trough, just beneath, or on the floor of the second story of my building. The middle spout $d^8$ delivers the small unpulverized lumps to the iron cylinder $e$; and there is a spout that at the lower end of the screen receives, and conveys out of the building, the stones and refuse. Experience has shown me that properly to do this duty, the screen $d$ needs to be set with a slight incline; and to be oscillated at a very rapid rate. To effect this, I place on a shaft a small eccentric, $i$, and by an elastic pitman $d^5$, connected rigidly by a bolt or bolts, to the upper end of the screen; and at its other end rigidly attached to the band of the eccentric. I give very rapid oscillations, some four hundred a minute, to the screen. The preferable diameter of the eccentric is some inch and a half, or even less.

The suspension elastic bars of the screen are preferably rigidly bolted to the screen, and to the building.

The pulverizing iron cylinder $e$ is suspended on short hollow pieces of shafting, one piece being fast to the left hand end of the said cylinder as indicated in Figs. 1 and 4, and the other piece to the right hand end of the sieve $e^4$; which sieve is rigidly attached to the cylinder by bars $e^2$, making the sieve and cylinder one structure. Through three pieces of hollow shafting, and through the sieve and the cylinder is placed a shaft $e^5$ that holds in the cylinder several sets of beaters $e^7$; that have an inclination toward the sieve, so that the small lumps of clay entering the left hand end of the cylinder are beaten, and the fine clay, and the stones forced into the sieve. The fine clay falls through the sieve, and the stones and refuse roll out of the large end of the sieve, into a spout that conveys them out of the building. The shafts just named are journaled at each end of the cylinder and sieve in the bearings indicated. By a pulley on the shaft $e^5$ there is given a very rapid motion to the beaters, of some five hundred revolutions a minute. By a belt on the right hand end of the sieve, a slow motion is given to the cylinder and sieve.

The various parts of my machinery constitute one machine, operating in one process; and are connected by shafts and gearing, such as any one familiar with such connections can easily make; and since they would complicate and obscure the drawings are not represented in them; and are not proper subjects of claims.

Sufficient, is it to say, that the shaft $c$ is preferably moved by cogs suitably connected with the general shafting, that the shaft $d^6$ is revolved by belts or gearing; and the cylinder and sieve by a belt, and the shaft $e^5$ by either gearing or belt, connected to the general shafting, and propelling steam engine. The cutters $c'''$ are quite small, and close together on the shaft $c^4$, and fill the whole space of the half of the diameter of the pan, and are twenty to forty or more in number. The scrapers are likewise numerous and fill the whole half diameter of the pan. The steam pipes beneath the pan are arranged by the "multiform plan," with free circulation of steam. The beaters are short and bolted to horizontal cross bars, which bars are held by radial arms. All else is believed to be apparent to any one familiar with the art to which my invention appertains.

I claim—

1. The described mechanism for pulverizing clay; consisting of a pulverizing pan or bed $a$, provided with its disk clay cutters, and bed, which operate on the clay, and then deliver it to the screen $d$; the said screen being made with three parts, which separate the fine clay, the unpulverized lumps and the refuse clay; delivering each to their separate spouts; and the lump pulverizing cylinder $e$, and its screen, which completes the action on the clay, the said parts being constructed as set forth.

2. In the described drying and pulverizing mechanism the bed or pan $a$, provided with the described series of disk cutters, revolving on a horizontal shaft, which sweeps over the whole floor of the pan about its central perpendicular shaft, which shaft is provided with a horizontal cross bar beam, fast to its top and by which the cutters are revolved, as set forth.

3. In the described drying and pulverizing bed or pan the cutters in a series on their shaft in combination with a series of scrapers on their arm or arms; which series of scrapers sweep the surface of the floor, of the pan as set forth.

4. In the described bed or pan, provided with a series of disk revolving cutters, and with a series of scrapers sweeping the floor of the pan, the metallic floor of the pan, in combination with a series of steam pipes heating the pan, and clay in the pan, while being pulverized, as set forth.

5. In the described pulverizing pan provided with a series of revolving cutters and sweeping scrapers the propelling cross bar beam $c'$, having at one of its ends the attachment of the shaft of the cutters and at the other end the attachment of the arms of the scrapers; the said beam or cross bar being fast on the top of the shaft $c$ and giving motion to the cutters and scrapers, as set forth.

6. In the described machinery for preparing clay for use, the screen $d$ constructed with sides continuous through its length, framed firmly to each other; and with its upper part suitably meshed to separate the fine clay; its middle part meshed to separate the unpulverized lumps of clay; and its lower part adapted to guide the refuse to its removing spout; the screen being suspended rigidly by strips of material, flexible in their middle portions; and a pitman fast rigidly to the screen, and flexible in its middle portion; and loosely attached at its other end to the moving eccentric as set forth.

7. In the described mechanism for preparing clay for use, the beating cylinder, provided with an attached sieve and with beaters in the said cylinder; the sieve revolving with the cylinder at a suitable screening rate; and the beaters with a rapid beating rate in the cylinder; the cylinder being with the sieve, on a hollow shaft with bearings; and the beaters on a shaft internal to the sieve and cylinder shaft as set forth.

THOMAS BLAKE CAMPBELL.

Witnesses:
SAMUEL J. PARKER,
T. J. MCELHENY.